Patented Mar. 18, 1924.

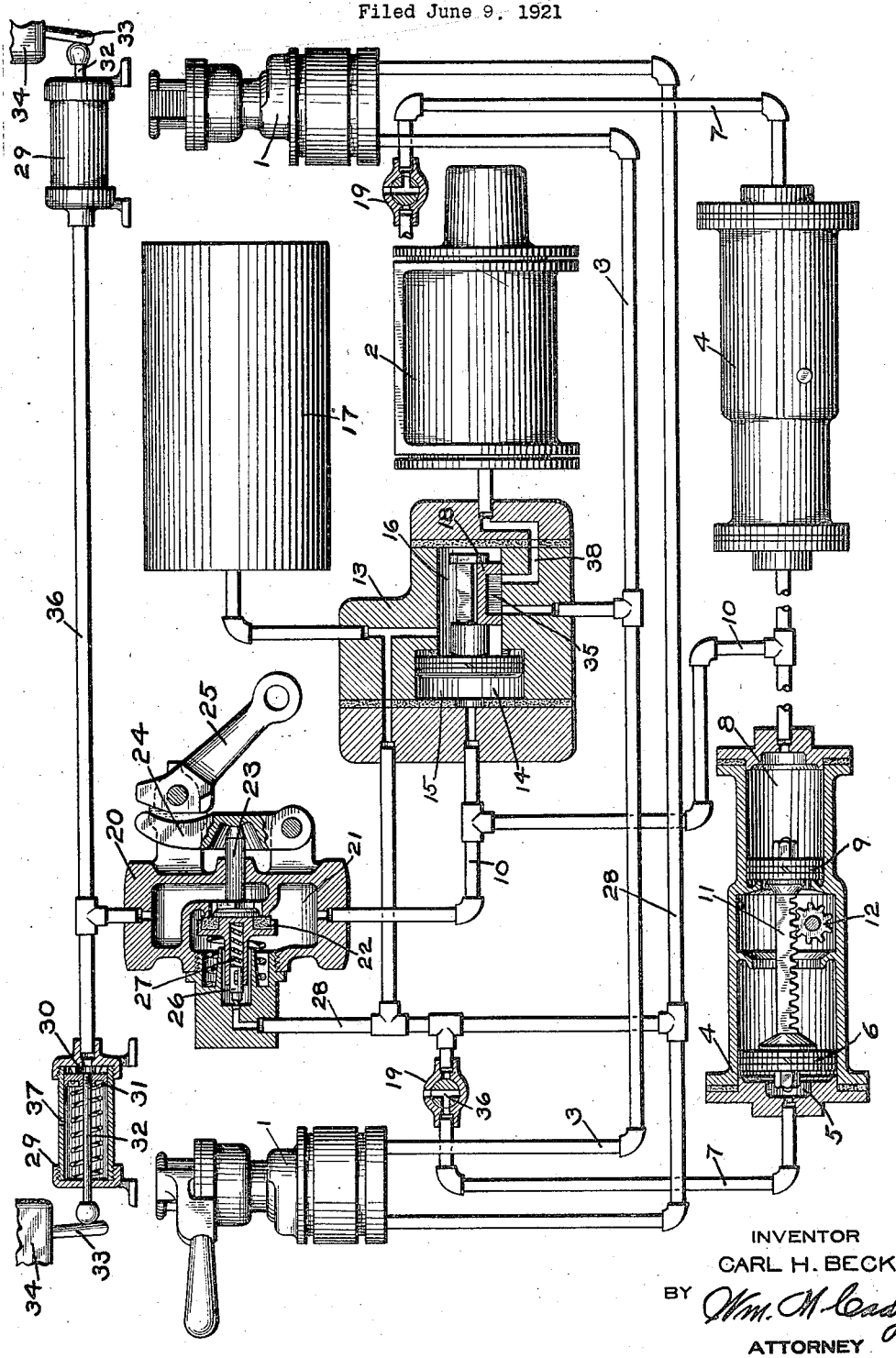

1,486,856

UNITED STATES PATENT OFFICE.

CARL H. BECK, OF MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL EQUIPMENT.

Application filed June 9, 1921. Serial No. 476,194.

*To all whom it may concern:*

Be it known that I, CARL H. BECK, a citizen of the United States, residing at Montclair, in the county of Essex and State of New Jersey, have invented new and useful Improvements in Safety Car-Control Equipments, of which the following is a specification.

This invention relates to safety car control equipments adapted for one man car operation.

One object of my invention is to provide a safety car control apparatus adapted for application to an existing straight air brake equipment.

Another object of the invention is to provide a safety car control equipment which may be controlled by a passenger for effecting an application of the brakes, the cutting off of power, and the unlocking or balancing of the car doors, to permit opening by hand.

Other objects and advantages will appear in the following more detailed description of the invention.

In the accompanying drawing, the single figure is a diagrammatic view, partly in section, of a straight air brake equipment with safety car control apparatus applied in accordance with my invention.

As shown in the drawing, the equipment is one of the double end type, having a straight air brake valve 1 at each end of the car, a brake cylinder 2, and a straight air brake pipe 3, through which fluid is supplied to the brake cylinder.

A door engine 4 is provided for controlling the door at each end of the car and may comprise a casing containing a differential piston device having the piston chamber 5 of the larger piston head 6 connected by pipe 7 to an operating cock 19 and the piston chamber 8 of the other piston head 9 connected to an emergency brake pipe 10, the piston heads 6 and 9 being connected together by a rack bar 11, the teeth of which engage a pinion 12 for controlling the car door in the usual manner.

An emergency valve device 13 is provided comprising a casing, having a piston chamber 14 connected to the emergency pipe 10 and containing a piston 15 and having a valve chamber 16 connected by a pipe to a main reservoir 17 or other source of fluid under pressure and containing a slide valve 18.

The safety apparatus being adapted for application to an existing straight air brake equipment, the emergency valve device 13 is controlled by a separate manually operated valve device, such as a conductor's valve device 20, since the straight air brake valve device is not provided with ports and connections for that purpose and the valve device 20 may comprise a casing having a valve chamber 21 containing a valve 22 provided with a valve stem 23.

The stem 23 engages a pivoted arm 24 adapted to be operated by a cam lever 25 which is connected to a cord or rope (not shown) running through the car.

Mounted in the main valve 22 is a small valve 26, subject to the pressure of a spring 27, for controlling communication from pipe 28, leading to the main reservoir 17, to valve chamber 21.

A circuit breaker cylinder 29 is provided at each end of the car, comprising a casing having a piston chamber 30 containing a piston 31 provided with a stem 32 for operating the switch handle 33 of the usual circuit breaker 34.

In operation, the brakes may be applied by straight air in the usual way, upon manipulation of one of the straight air brake valves 1 so as to supply fluid under pressure from the main reservoir pipe 28 to the straight air pipe 3 and thence through the cavity 35 in the emergency slide valve 18 to the brake cylinder 2, and the brakes may be released by exhausting fluid from the brake cylinder through the straight air pipe and the brake valve.

The doors may be controlled by the motorman by operating the cock 19. In the position shown, the three way port 36 in the cock, connects pipe 7 with the atmosphere and with the valve 22 seated, the valve 26 of the conductor's valve device is open, so that fluid under pressure is supplied to the valve chamber 21 and thence to the emergency brake pipe 10, the emergency piston chamber 14 and the piston chamber 8 of each door engine 4.

The fluid pressure on piston 9 then acts to maintain the differential pistons in the position shown in the drawing, in which the car door is held closed, By turning the cock 19, the pipe 3 may be connected to the main reservoir pipe 28, so that fluid under pressure is supplied to piston chamber 5 and since the piston head 6 is of larger area than the piston head 9, the differential piston will be shifted to the right, in which movement, the car door is opened.

If, in an emergency, the cam lever 25 be actuated by a passenger in the car, by pulling the attached cord, the valve 22 will be pushed off its seat, so that fluid under pressure in piston chamber 14 of the emergency valve device will be vented to pipe 36 and thence to the piston chamber 30.

The piston 31 is then operated to throw the circuit breaker handle 33 and cut off the operating power of the car and after the piston 31 has moved a certain distance, an exhaust port 37 is opened, so that fluid is now vented from the piston chamber 14 to the atmosphere.

The emergency piston 15 is thereupon shifted, so that the valve 18 uncovers the brake cylinder port 38, permitting fluid under pressure to be supplied from the main reservoir 17 and valve chamber 16 directly to the brake cylinder 2 to effect an emergency application of the brakes. Fluid is also vented from the piston chamber 8 of the door engine and since the piston head 6 is normally subject to atmospheric pressure the fluid pressures on the door engine will be balanced, so that the car doors may be opened by the passengers in the car.

The opening of the valve 22 operates to close the valve 26, so that the main reservoir connection is cut off from the emergency brake pipe 10 so long as the valve 22 remains open.

Having now described my invention, what I claim as new and desire to secure by Letters Patent, is:—

1. The combination with a straight air brake equipment including a brake cylinder and a straight air brake valve device for controlling the supply of fluid to the brake cylinder, of an emergency brake pipe, an emergency valve device operated upon a reduction in brake pipe pressure for supplying fluid to the brake cylinder, and a valve device for normally supplying fluid under pressure to the emergency valve device and manually operative to vent fluid from the brake pipe.

2. The combination with a straight air brake equipment including a brake cylinder and a straight air brake valve device for controlling the supply of fluid to the brake cylinder, of an emergency brake pipe, an emergency valve device operated upon a reduction in brake pipe pressure for supplying fluid to the brake cylinder, and a valve device for normally supplying fluid under pressure to the emergency valve device and manually operative to cut off the supply of fluid to and vent fluid from said brake pipe.

3. The combination with a straight air brake equipment, of a fluid pressure operated door engine, an emergency valve device operated upon a reduction in fluid pressure for effecting an application of the brakes, and a manually operated valve for controlling the fluid pressure on said door engine and the emergency valve device.

4. The combination with a straight air brake equipment, of a fluid pressure operated door engine, an emergency valve device operated upon a reduction in fluid pressure for effecting an application of the brakes, a device operated by fluid under pressure for cutting off the power to the car, and a manually operated valve for controlling the fluid pressure on said door engine, the emergency valve device, and the device for cutting off the power to the car.

5. The combination with an emergency brake pipe and an emergency valve device operated upon a reduction in brake pipe pressure for effecting an application of the brakes, of manually operated valve means for supplying fluid under pressure to the emergency brake pipe in one position and for cutting off said supply and venting fluid from the brake pipe in another position and a brake valve device for normally controlling the application of the brakes.

In testimony whereof I have hereunto set my hand.

CARL H. BECK.